US012691675B2

(12) United States Patent
Nakashima et al.

(10) Patent No.: US 12,691,675 B2
(45) Date of Patent: Jul. 28, 2026

(54) LIQUID DISCHARGE HEAD AND LIQUID DISCHARGE APPARATUS

(71) Applicants: Makito Nakashima, Kanagawa (JP); Kiyoshi Amari, Kanagawa (JP); Toshihiro Kanematsu, Kanagawa (JP); Shusei Murai, Tokyo (JP); Tatsumi Suzuki, Tokyo (JP); Hiroshi Wada, Kanagawa (JP)

(72) Inventors: Makito Nakashima, Kanagawa (JP); Kiyoshi Amari, Kanagawa (JP); Toshihiro Kanematsu, Kanagawa (JP); Shusei Murai, Tokyo (JP); Tatsumi Suzuki, Tokyo (JP); Hiroshi Wada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 61 days.

(21) Appl. No.: 18/707,891

(22) PCT Filed: Nov. 21, 2022

(86) PCT No.: PCT/IB2022/061192
§ 371 (c)(1),
(2) Date: May 7, 2024

(87) PCT Pub. No.: WO2023/126709
PCT Pub. Date: Jul. 6, 2023

(65) Prior Publication Data

US 2025/0367920 A1 Dec. 4, 2025

(30) Foreign Application Priority Data

Dec. 28, 2021 (JP) ................................. 2021-214261

(51) Int. Cl.
*B41J 2/02* (2006.01)
*B41J 2/025* (2006.01)
(Continued)

(52) U.S. Cl.
CPC ................. *B41J 2/02* (2013.01); *B41J 2/025* (2013.01); *B41J 2/03* (2013.01); *B41J 2/045* (2013.01);
(Continued)

(58) Field of Classification Search
CPC ....... B41J 2/02; B41J 2/025; B41J 2/03; B41J 2/045; B41J 2/1429; B41J 2002/041
See application file for complete search history.

(56) References Cited

U.S. PATENT DOCUMENTS 9,586,411 B2 3/2017 Guidotti et al.
10,987,927 B2 * 4/2021 Kaiba ........................ B41J 2/04
(Continued)

FOREIGN PATENT DOCUMENTS

CN 111148577 A 5/2020
EP 3984649 A1 4/2022
(Continued)

OTHER PUBLICATIONS

Office Action issued Aug. 20, 2025 in Japanese Patent Application No. 2021-214261, 5 pages.
(Continued)

*Primary Examiner* — Geoffrey S Mruk
(74) *Attorney, Agent, or Firm* — XSENSUS LLP

(57) ABSTRACT

A liquid discharge head includes: a discharge port, from which a liquid is to be discharged; and an openably closing valve configured to move in a moving direction toward the discharge port to openably close the discharge port, the openably closing valve including a core, wherein the core has a core end at one end of the core opposing the discharge port, the core end has: a concave in the core end, the concave recessed in a direction opposite to the discharge port; and an elastic member covering the concave and an outer side face of the core end continuously.

18 Claims, 11 Drawing Sheets

(51) Int. Cl.

| | |
|---|---|
| ***B41J 2/03*** | (2006.01) |
| ***B41J 2/04*** | (2006.01) |
| ***B41J 2/045*** | (2006.01) |
| *B41J 2/14* | (2006.01) |

(52) U.S. Cl.

CPC ........ *B41J 2002/041* (2013.01); *B41J 2/1429* (2013.01)

(56) References Cited

U.S. PATENT DOCUMENTS

| | | | |
|---|---|---|---|
| 11,712,704 | B2 * | 8/2023 | Maruyama ............ B05B 1/3046 427/421.1 |
| 2012/0105522 | A1 | 5/2012 | Wallsten et al. |
| 2013/0293607 | A1 | 11/2013 | Kaiba et al. |
| 2015/0009254 | A1 | 1/2015 | Kaiba et al. |
| 2018/0086060 | A1 | 3/2018 | Wallsten et al. |
| 2018/0336443 | A1 | 11/2018 | Kaiba et al. |
| 2019/0217614 | A1 | 7/2019 | Kaiba et al. |
| 2019/0272454 | A1 | 9/2019 | Kaiba et al. |
| 2020/0023580 | A1 | 1/2020 | Kaiba et al. |
| 2020/0031117 | A1 | 1/2020 | Kaiba et al. |
| 2020/0039217 | A1 | 2/2020 | Kaiba et al. |
| 2020/0246814 | A1 | 8/2020 | Fritz et al. |
| 2020/0272867 | A1 | 8/2020 | Kaiba et al. |
| 2020/0324312 | A1 | 10/2020 | Kaiba et al. |
| 2022/0111405 | A1 | 4/2022 | Maruyama et al. |
| 2022/0111406 | A1 | 4/2022 | Kudoh et al. |
| 2022/0161562 | A1 | 5/2022 | Murai et al. |

FOREIGN PATENT DOCUMENTS

| | | | |
|---|---|---|---|
| JP | 2019006012 | A | 1/2019 |
| JP | 2020-023177 | A | 2/2020 |
| JP | 2021049530 | A | 4/2021 |
| JP | 2022-064482 | A | 4/2022 |
| WO | 94/08794 | A1 | 4/1994 |
| WO | 2012/058373 | A2 | 5/2012 |

OTHER PUBLICATIONS

International Search Report and Written Opinion issued on Jan. 26, 2023 in PCT/IB2022/061192 filed on Nov. 21, 2022, 10 pages.

Office Action issued Mar. 14, 2026 in related Chinese Patent Application No. CN202280084199.3.

* cited by examiner

COMPARATIVE EXAMPLE

COMPARATIVE EXAMPLE

LIQUID DISCHARGE HEAD AND LIQUID DISCHARGE APPARATUS

CROSS-REFERENCE TO RELATED APPLICATIONS

This patent application is based on PCT filing PCT/IB2022/061192, filed on Nov. 21, 2022, which claims priority from Japanese Patent Application No. 2021-214261, filed on Dec. 28, 2021, the entire disclosures of each are hereby incorporated by reference herein.

TECHNICAL FIELD

The present embodiment relates to a liquid discharge head and a liquid discharge apparatus.

BACKGROUND ART

There is a liquid discharge head for controlling the discharge of a liquid by opening and closing an openably closing valve with respect to a discharge port. In such a liquid discharge head, the openably closing valve is provided with an elastic member to seal the discharge port when the openably closing valve is closed. For example, in PTL 1 (US 2012/0105522 A1), an elastic member formed of a perfluoro-elastomer is provided in a concave provided on an inner face of an openably closing valve on a discharge port side.

However, if the elastic member does not adhere sufficiently to the openably closing valve, there is a problem in that a gap is generated between the elastic member and the openably closing valve. In particular, if the openably closing valve is repeatedly moved up and down and the elastic member is pressed against the discharge port many times, there is a problem in that the elastic member peels off from the openably closing valve and a gap is created between the elastic member and the openably closing valve.

Further, when the openably closing valve is opened and a size of a gap formed between the openably closing valve and a member such as a nozzle plate including the discharge port varies by an amount corresponding to the gap created between the elastic member and the openably closing valve, there is a problem in that the amount of liquid discharged from the discharge port also varies.

CITATION LIST

Patent Literature

[PTL 1]
US 2012/0105522 A1

SUMMARY OF INVENTION

Technical Problem

An object of the present embodiment is to improve the adhesion of an elastic member to a core end.

Solution to Problem

In an aspect of this disclosure, a liquid discharge head includes: a discharge port, from which a liquid is to be discharged; and an openably closing valve configured to move in a moving direction toward the discharge port to openably close the discharge port, the openably closing valve including a core, wherein the core has a core end at one end of the core opposing the discharge port, the core end has: a concave in the core end, the concave recessed in a direction opposite to the discharge port; and an elastic member covering the concave and an outer side face of the core end continuously.

Advantageous Effects of Invention

According to the present embodiment, it is possible to improve the adhesion of an elastic member to a core end.

BRIEF DESCRIPTION OF DRAWINGS

A more complete appreciation of embodiments of the present disclosure and many of the attendant advantages and features thereof can be readily obtained and understood from the following detailed description with reference to the accompanying drawings.

Figure 1A:
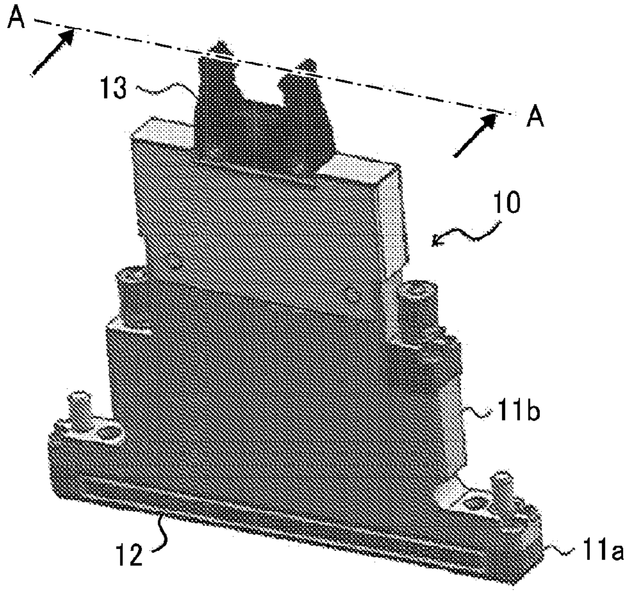
FIGS. 1A and 1B are external perspective views of a liquid discharge head according to an embodiment of the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

Description of Embodiments

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Figure 1B:
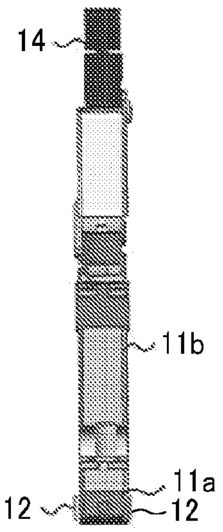

Embodiments of the present embodiment will be described below with reference to the drawings. FIGS. 1A and 1B are external explanatory views of a liquid discharge head according to an embodiment of the present embodiment. FIG. 1A is an overall perspective view of the liquid discharge head, and FIG. 1B is an overall side view of the liquid discharge head. The liquid discharge head of the present embodiment discharges ink as liquid.

A liquid discharge head 10 includes a first housing 11*a* as a first housing and a second housing 11*b* as a second housing. The second housing 11*b* is laminated on and joined to the first housing 11*a*. The first housing 11*a* is formed of a material having high thermal conductivity such as a metal, and the second housing 11*b* is formed of a material having low thermal conductivity such as a resin. In the following description, the two housings may collectively be referred to as a housing 11.

The first housing 11*a* includes a heater 12 as a heating means on a front face and a rear face of the first housing 11*a*. The temperature of the heater 12 is controllable and the heater 12 heats the first housing 11*a*. The second housing 11*b* includes a connector 13 to perform communication by using electrical signals in an upper portion of the second housing 11*b*.

Figure 2:
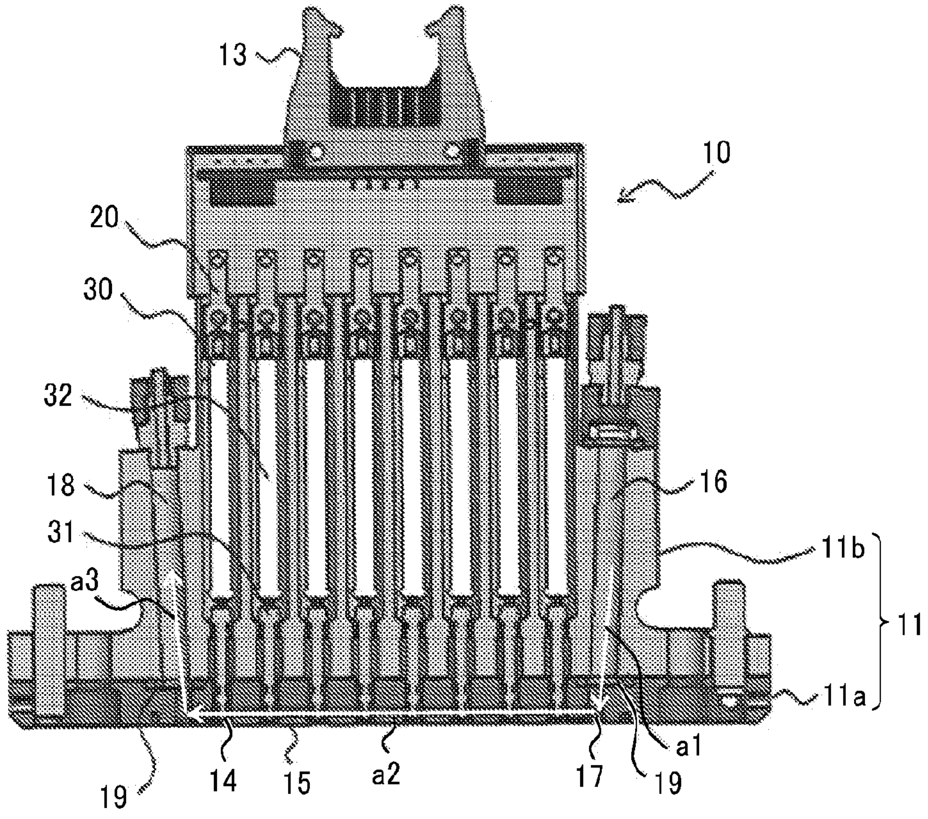
FIG. 2 is an overall cross-sectional view of the liquid discharge head according to an embodiment of the present embodiment.

FIG. 2 is an overall cross-sectional view of the liquid discharge head 10 according to an embodiment of the present embodiment and is a cross-sectional view taken along line A-A indicated by arrows in FIG. 1A. The first housing 11*a* holds a nozzle plate 15 as a discharge port forming member. The nozzle plate 15 includes nozzles 14 as discharge ports for discharging a liquid. The first housing 11*a* also includes a channel 17, which is a liquid supply portion. The channel 17 transports ink from a supply port 16 toward a collection port 18 via the nozzle plate 15.

The second housing 11*b* includes the supply port 16 and the collection port 18. The supply port 16 and the collection port 18 are connected to one side and the other side of the channel 17, respectively. A plurality of liquid discharge modules 30 are arranged between the supply port 16 and the collection port 18. The liquid discharge modules 30 discharge the ink in the channel 17 from the nozzles 14. In an upper portion of the liquid discharge modules 30, regulating members 20 are provided.

The number of the liquid discharge modules 30 corresponds to the number of nozzles 14 provided in the first housing 11*a*. A configuration described in the present example includes eight of the liquid discharge modules 30 corresponding to eight of the nozzles 14 arranged in one row. The number and the arrangement of the nozzles 14 and the liquid discharge modules 30 are not limited to the configuration described above. For example, instead of a plurality of the nozzles 14 and a plurality of the liquid discharge modules 30, one of the nozzles 14 and one of the liquid discharge modules 30 may be provided. Further, the nozzles 14 and the liquid discharge modules 30 may be arranged in a plurality of rows, instead of being arranged in one row.

In FIG. 2, a housing sealing member 19 is provided in a joining portion between the first housing 11*a* and the second housing 11*b*. In the present example, an O-ring is used as the housing sealing member to prevent ink from leaking from the joining portion between the first housing 11*a* and the second housing 11*b*.

According to the above-described configuration, the supply port 16 takes in pressurized ink from the outside, transports the ink in a direction indicated by an arrow a1, and supplies the ink to the channel 17. The channel 17 transports the ink from the supply port 16 in a direction indicated by an arrow a2. Subsequently, the collection port 18 collects, in a direction indicated by an arrow a3, ink that is not discharged from the nozzles 14 arranged along the channel 17.

Each of the liquid discharge modules 30 includes an openably closing valve 31 and a piezoelectric element 32 as a driving body. The openably closing valve 31 opens and closes the nozzle 14. The piezoelectric element 32 drives the openably closing valve 31. When a voltage is applied to the piezoelectric element 32, the piezoelectric element 32 expands and contracts in a longitudinal direction, which is an up-down direction in FIG. 2.

In the above-described configuration, if the piezoelectric element 32 is operated to move the openably closing valve 31 upward, the nozzle 14 that is closed by the openably closing valve 31 is opened, and ink can be discharged from the nozzle 14. If the piezoelectric element 32 is operated to move the openably closing valve 31 downward, a distal end portion of the openably closing valve 31 seals the nozzle 14 so that the nozzle 14 is closed, and no ink is discharged from the nozzle 14.

Figure 3:
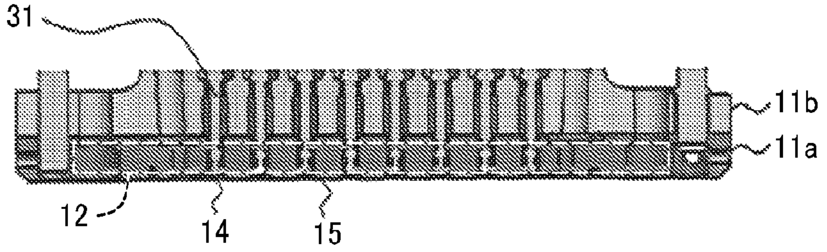
FIG. 3 is a diagram illustrating a position of a heater provided in the liquid discharge head.

FIG. 3 is an explanatory view illustrating a positional relationship with the heating means of the liquid discharge head 10 according to an embodiment of the present embodiment. The first housing 11*a* includes the heater 12 in a vicinity of the nozzles 14. The heater 12 spans across the plurality of nozzles 14 as indicated by a broken line in FIG. 3.

Figure 4A:
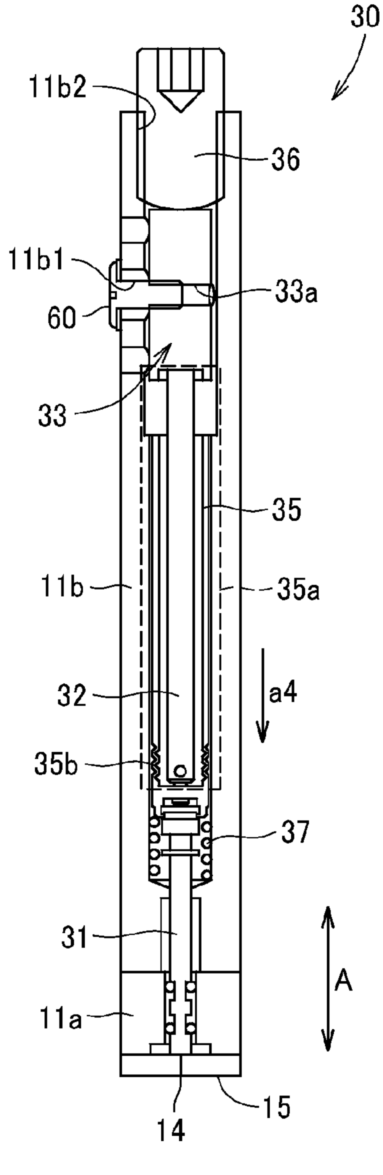
FIGS. 4A and 4B are cross-sectional views of the liquid discharge head.
Figure 4B:
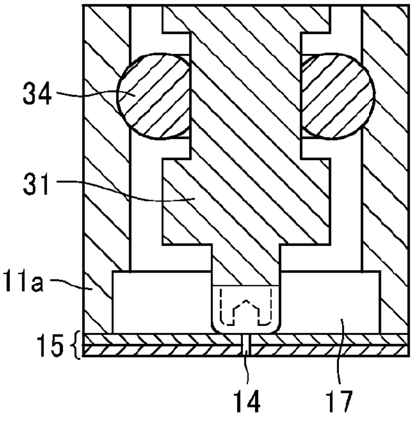

Next, details of the liquid discharge module 30 will be described with reference to FIGS. 4A and 4B. FIG. 4A is a cross-sectional view of a single liquid discharge module, and FIG. 4B is an enlarged view of a main portion of FIG. 4A. In an outer periphery of a shaft portion of the openably closing valve 31, O-rings 34 are mounted in a two-stage structure including an upper and a lower O-ring, to prevent leakage of ink under high pressure.

The liquid discharge module 30 mainly includes the openably closing valve 31 and the piezoelectric element 32 described above, a securing member 33, a holding body 35, a plug 36, and the like.

The holding body 35 includes a driving body accommodating portion 35*a* therein, and the piezoelectric element 32 is accommodated and held in the driving body accommodating portion 35*a*. The holding body 35 is formed of a metal that is elastically expandable and contractible in the longitudinal direction of the piezoelectric element 32. For example, stainless steel such as SUS304 or SUS316L can be used as the elastically expandable and contractible metal. The holding body 35 is a frame body in which a plurality of thin elongated members extending in the longitudinal direction are arranged around the piezoelectric element 32 (for example, four of the thin elongated members are arranged at intervals of 90°), and the piezoelectric element 32 can be inserted inside the holding body 35 through a space between the thin elongated members.

The longitudinal direction of the piezoelectric element 32 is a direction A indicated by a double arrow in FIG. 4A, and this longitudinal direction A is also the longitudinal direction of the openably closing valve 31, the liquid discharge module 30, and the second housing 11*b*. Further, the longitudinal direction A is also a moving direction of the openably closing valve 31.

The openably closing valve 31 is coupled to a distal end portion of the holding body 35 on a side of the nozzle 14. The holding body 35 is formed with a bellows portion 35*b* on the side of the nozzle 14. When the piezoelectric element 32 is expanded and contracted, the bellows portion 35*b* serves for expanding and contracting the distal end side of the holding body 35 in the longitudinal direction, similarly to the piezoelectric element 32.

The securing member 33 is coupled to a proximal end side of the holding body 35 on a side opposite to the side of the nozzle 14. In other words, the securing member 33 is accommodated in an upper end portion of the second housing 11*b*.

The securing member 33 includes a threaded through-hole 33*a* extending in a radial direction. A positioning screw 60 is screwed into the threaded through-hole 33*a* from outside the second housing 11*b*.

The positioning screw 60 is inserted into an elongated hole 11*b*1 elongated in the longitudinal direction and formed in the upper end portion of the second housing 11*b*, and the positioning screw 60 can move a predetermined length in the longitudinal direction of the second housing 11*b* in FIGS. 4A and 4B. The positioning screw 60 is tightened in a state where the securing member 33 is positioned in the longitudinal direction.

On the other hand, a female screw hole 11*b*2 is formed in an upper end opening portion of the second housing 11*b*. The plug 36 that abuts against the regulating member 20 of FIG. 2 is screwed into the female screw hole 11*b*2. The plug 36 abuts against an upper end portion of the securing member 33 that is positioned in the longitudinal direction by the positioning screw 60 to finally fix a position of the securing member 33.

The second housing 11*b* includes a compression spring 37 arranged in a lower end portion of the second housing 11*b*. The compression spring 37 urges the piezoelectric element 32, the holding body 35 holding the piezoelectric element 32, and the like upward.

Next, the configuration of an end portion on one side of the openably closing valve 31 in the longitudinal direction, which is an end portion of the side of the openably closing valve 31 facing the nozzle 14, will be described. The end portion on the one side of the openably closing valve 31 in the longitudinal direction is a portion of the openably closing valve 31 for opening and closing the nozzle 14.

Figure 5:
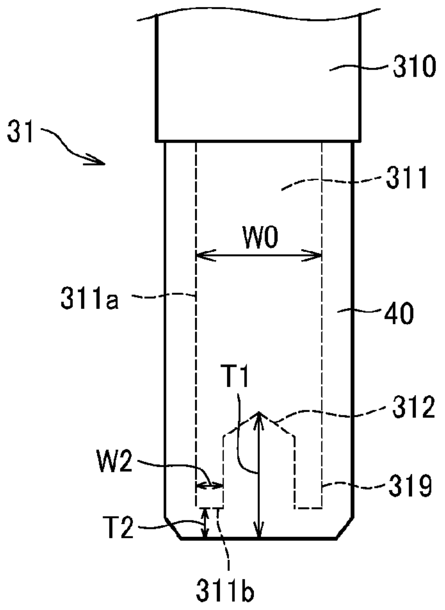
FIG. 5 is a plan view illustrating a configuration of a distal end portion of an openably closing valve on a nozzle side.

As illustrated in FIG. 5, the openably closing valve 31 includes a core 310 and a sealing member 40 as an elastic member. The core 310 is formed of a metal material such as stainless steel. The core 310 includes a core end 311 at an end portion of the core 310 on the side of the nozzle 14, which is a lower side in FIG. 5. The core end 311 includes a concave 312 on the inside of the core end 311 and the concave 312 is opened to a nozzle side. The core end 311 has a cylindrical shape in a portion corresponding to the concave 312 in the longitudinal direction, and a portion other than the portion corresponding to the concave 312 in the longitudinal direction has a columnar shape. However, a cross section of the core end 311 may have another shape than a circular shape. The concave 312 can be formed by cutting or polishing the columnar member, for example. By providing the concave 312, it is possible to increase the rectilinear distance travelled by the ink.

The sealing member 40 is provided to cover (span across) the concave 312 and a side face 311*a* on an outer side face of the core end 311, which is an outer peripheral face of the core end 311, continuously. The sealing member 40 of the present embodiment is formed of a perfluoroelastomer. Specifically, it is preferable to use "DAI-EL GA-55: registered trademark of Daikin Industries, Ltd.", "AFLAS PREMIUM PM1100®: registered trademark of Asahi Glass Co., Ltd.", "KERLEZ®: registered trademark of DuPont Co., Ltd., and the like as the sealing member 40.

The lengths of the concave 312 and the sealing member 40 in the radial direction of the core end 311 are designed longer than a diameter of the nozzle 14. That is, the sealing member 40 can cover and seal the nozzle 14 when the openably closing valve 31 is closed.

Next, an opening and closing operation of the openably closing valve 31 will be described.

Figure 6A:
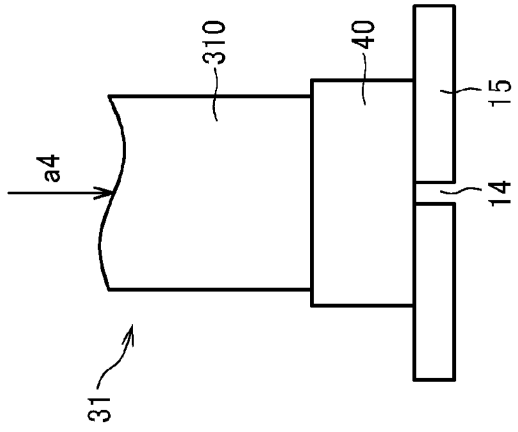
FIGS. 6A to 6C are diagrams for explaining an opening and closing operation of the openably closing valve.

When the piezoelectric element 32 is operated to depress the openably closing valve 31 in a direction of an arrow a4 in FIG. 4A, a bottom face of the sealing member 40 contacts the nozzle plate 15 and covers the nozzle 14, as illustrated in FIG. 6A. However, the nozzle 14 is not completely sealed in this state.

Figure 6B:
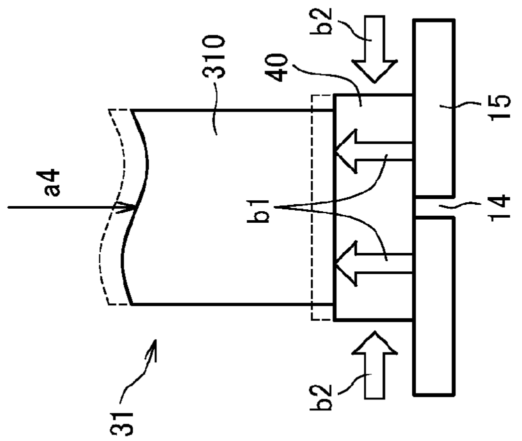

As illustrated in FIG. 6B, the piezoelectric element 32 presses the openably closing valve 31 further downward from the state illustrated in FIG. 6A, and thus, the sealing member 40 is squeezed between the core 310 and the nozzle plate 15. In this state, stress is generated from the nozzle plate 15 to the sealing member 40 in a direction of an arrow b1. When this stress is greater than an ink supply pressure indicated by arrows b2, the nozzle 14 can be sealed by the sealing member 40.

Figure 6C:
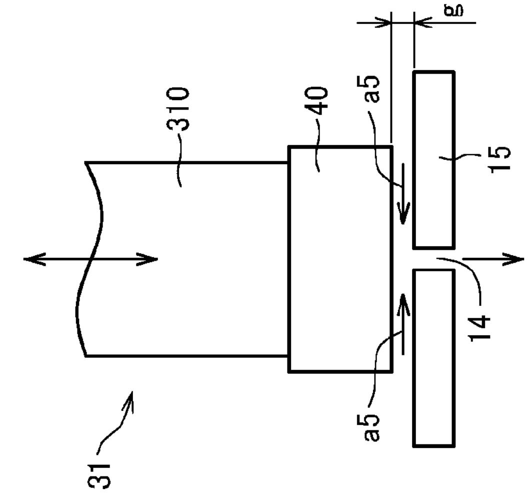

Further, as illustrated in FIG. 6C, the piezoelectric element 32 operates to move the openably closing valve 31 upward. Thus, a gap g is formed between the nozzle plate 15 and the openably closing valve 31. Therefore, ink is supplied in directions of arrows a5. The nozzle 14 is opened. The gap g may also be regarded as a lift amount of the openably closing valve 31 from the nozzle plate 15, and hereinafter, the gap g is also referred to as the lift amount g of the openably closing valve 31. The openably closing valve 31 moves up and down by the drive of the piezoelectric element 32, and thus, ink is discharged from the nozzle 14.

When molding the core end 311 including the sealing member 40 formed of a perfluoroelastomer described above, the core 310 is molded by pressing or injection molding, and a perfluoroelastomer is filled into a heated mold to vulcanize the perfluoroelastomer. Thus, the core 310 and the sealing member 40 are integrally molded.

In the vulcanization of the perfluoroelastomer, it is preferable to use a peroxide vulcanization. In the peroxide vulcanization, iodine and bromine incorporated in a polymer raw material are used as reaction sites, and a multifunctional unsaturated compound is used as a cross-linking auxiliary agent to form a cross-linked structure by a radical reaction generated by the peroxide. Radicals generated by thermal decomposition of the peroxide in the mixture react with the iodine and bromine to generate polymer radicals. In this reaction, the polymer radicals are loaded onto the multifunctional unsaturated compound to generate a cross-linked structure. The iodine and bromine may be introduced as cross-linking monomers by copolymerization, or by utilizing a chain transfer reaction to introduce the iodine or bromine at terminal ends of the molecules. It is preferable to use triallyl isocyanurate (TAIC) or trimethallyl isocyanurate (TMAIC) as the multifunctional unsaturated compound.

In the vulcanization of the perfluoroelastomer, it is preferable to first perform a primary vulcanization, and then, further perform a secondary vulcanization. Thus, it is possible to sufficiently complete the vulcanization reaction, and stabilize mechanical properties such as a compression set of the perfluoroelastomer. The optimum conditions of the vulcanization method may be selected according to the selected molding method. For example, in the primary vulcanization by pressing, preferable conditions are 160° C. to 180° C. for several minutes to about 20 minutes. In the secondary vulcanization, preferable conditions are 220° C. to 250° C. for about 2 to 4 hours.

Thus, by providing the concave 312 in the core end 311, a portion of the sealing member 40 provided in the concave 312 functions as a stopper that prevents the sealing member 40 from detaching from the core end 311. In particular, in the present embodiment, by integrally molding the sealing member 40 with the openably closing valve 31, it is possible to provide the sealing member 40 in the concave 312 without a gap, and a gap is less likely to form between the sealing member 40 and the concave 312.

If the adhesion of the sealing member 40 to the core end 311 is insufficient and a gap is formed between the concave 312 and the sealing member 40, the amount of ink discharged from the nozzles 14 varies. That is, in a configuration where such a gap is likely to occur, a position of a lower face of the sealing member 40 in FIGS. 6A to 6C tends to vary. Further, a gap is formed between the concave 312 and the sealing member 40, and thus, when the openably closing valve 31 is pressed against the nozzle plate 15 as illustrated in FIG. 6B, an error in the amount by which the sealing member 40 is pushed into and compressed by the openably closing valve 31 increases. Thus, an error occurs in the actual movement amount of the openably closing valve 31 with respect to the movement amount of the piezoelectric element 32, and variations also occur in the lift amount g of the openably closing valve 31 in FIG. 6C.

In contrast, in the present embodiment, the sealing member 40 is provided to cover (span across) the concave 312 and the side face 311*a* of the core end 311 continuously, so that it is possible to improve the adhesion of the sealing member 40 to the core end 311. Since the sealing member 40 is held by the side face 311*a*, for example, when the openably closing valve 31 is repeatedly moved up and down, it is possible to prevent the sealing member 40 provided in the concave 312 from peeling off from the concave 312 to form a gap within the concave 312, and prevent the sealing member 40 in the concave 312 from detaching from the core end 311. Thus, by the opening and closing operation of the openably closing valve 31, which will be described later, when the openably closing valve 31 is pressed against and compressed by the nozzle plate 15 or when the openably closing valve 31 is released from the compressed state to cancel the compressed state, it is possible to suppress variations in a position of the bottom face of the sealing member 40, which is an end portion of the openably closing valve 31 on the side of the nozzle 14. Thus, variations in the lift amount "g" can be reduced, and variations in the amount of ink discharged from the nozzles 14 can be reduced. In particular, in the present embodiment, the sealing member 40 is provided around the periphery (entire circumference) of the side face 311*a* of the core end 311, so that it is possible to further improve the adhesion of the sealing member 40 to the core end 311.

By providing the sealing member 40 in the concave 312 and also providing the sealing member 40 to cover (span across) a bottom face 311*b* and the side face 311*a* (in particular, a portion of the side face 311*a* on the side of the bottom face 311*b*) continuously, it is possible to improve the sealing performance of the nozzles 14 when the openably closing valve 31 is closed.

Here, as illustrated in FIG. 5, the thickness of a portion of the sealing member 40 facing the nozzles is defined as a thickness T1. A portion of the core end 311 surrounding the concave 312 is defined as a convex portion 319. The thickness of a portion of the sealing member 40 corresponding to the bottom face 311*b* of the core end 311, which is an end face of the convex portion 319 on the side of the nozzles 14 in the longitudinal direction, is defined as a thickness T2. The convex portion 319 has a cylindrical shape. At this time, the value of T1/T2 is preferably 1.6 or more and 6 or less. If the thickness T1 is increased, the size of the sealing member 40 arranged in the concave 312 is increased, but there is a problem in that the sealing member 40 is easily deformed downward in the concave 312 during thermal expansion. Further, although increasing the thickness T2 is advantageous for sealing the nozzles 14 by the openably closing valve 31, there is a problem in that an operation amount of the piezoelectric element 32 increases. Considering the above-described features, the thickness T1 and the thickness T2 are set within the ranges described above. In other words, the thickness T1 is the length in the longitudinal direction from a bottom portion of the concave 312 at the upper end portion in FIG. 5 to an end portion of the sealing member 40 on the side of the nozzles 14.

Figure 7:
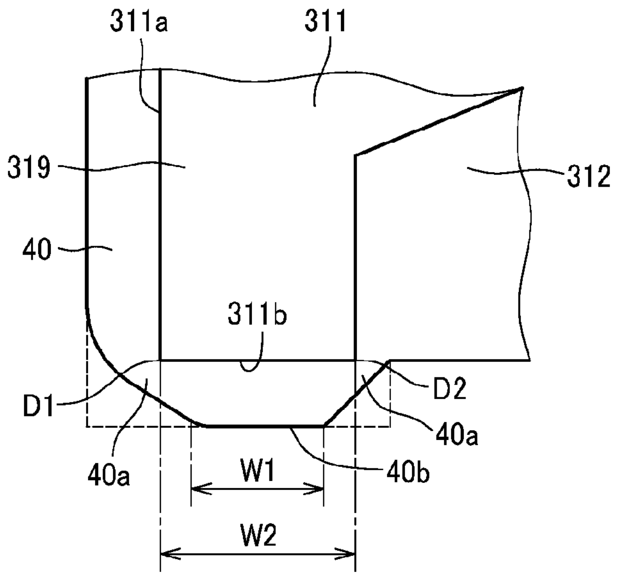
FIG. 7 is a diagram for explaining a width of a sealing member.

As illustrated in FIG. 7, the sealing member 40 may be configured to include thin portions 40*a* at positions corresponding to edges D1 and D2 of the convex portion 319. Specifically, the thin portions 40*a* have shapes in which corner portions (refer to dotted line portions in FIG. 7) corresponding to the edges D1 and D2 of the sealing member 40 are respectively rounded or chamfered. However, a chamfering angle is not limited to 45 degrees in the chamfering. The thin portions 40*a* of the present embodiment are portions having a smaller thickness than other portions of the sealing member 40. The term "portions having a smaller thickness" includes both a portion where the absolute value of the thickness is small, and, when assuming that the sealing member 40 has a shape that follows the shape of the core end 311, a portion where an offset amount of an end portion of the sealing member 40 from the core end 311 is smaller than that of other portions. For example, the thin portions 40*a* of the present embodiment have a smaller thickness than the shape illustrated by the dotted lines in FIG. 7, and the offset amount from the core end 311 is smaller than that of other portions of the sealing member 40. Further, the term "portions" of the sealing member 40 "corresponding to" the edges D1 and D2 and the like of the core end 311 refers to portions corresponding to each portion such as the edges D1 and D2 of the core end 311, when assuming that the sealing member 40 has a shape that follows the shape of the core end 311. The edges D1 and D2 are circumferential edges of the bottom face 311*b* of the core end 311 or the end face of the convex portion 319 on the side of the nozzles 14 in the longitudinal direction, and the edge D1 forms an outer peripheral edge, and the edge D2 forms an inner peripheral edge of the core end 311 or the convex portion 319.

In other words, a width W1 of the sealing member 40 is smaller than a width W2. The width W1 is the width of a flat portion 40*b* provided facing the nozzle plate 15 on a lower side of FIG. 7, that is, a side of the sealing member 40 closer to the nozzle plate 15 than the convex portion 319 (see FIG. 4B). The width W2 is the width of the convex portion 319 in the radial direction. The width W2 of the convex portion 319 in the radial direction referred to herein does not indicate an outer diameter W0 of the convex portion 319 or the core end 311 in FIG. 5, but indicates the width in the radial direction of a thick portion provided in the radial direction of the convex portion 319.

As illustrated in FIG. 7, when the sealing member 40 thermally expands or swells, in particular the portions corresponding to the edges D1 and D2 of the core end 311 easily increase in size. Thus, by providing in advance a portion of the sealing member 40 that easily expands as a portion having a small size as described above, it is possible to prevent a face of the seal member 40 contacting the nozzle plate 15 from being strongly deformed, such as the positions of the sealing member 40 corresponding to the edges D1 and D2 taking a thin shape, due to the expansion of the sealing member 40. Therefore, it is possible to suppress variations in the gap g when the openably closing valve 31 is opened, and stabilize the amount of ink discharged by a liquid discharge head.

Figure 8:
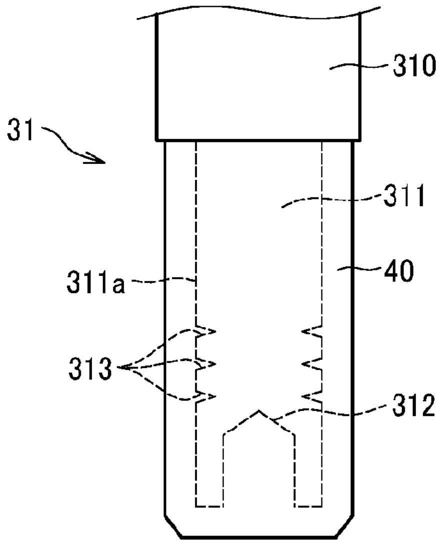
FIG. 8 is a plan view illustrating another embodiment of the openably closing valve.

As a modified example of the distal end portion of the openably closing valve 31, grooves 313 may be provided in the side face 311*a* of the core end 311, as illustrated in FIG. 8. The grooves 313 are circumferentially provided on the side face 311*a* and a plurality of the grooves 313 are provided in the longitudinal direction of the core end 311.

If the grooves 313 are provided, the perfluoroelastomer, which is the material forming the sealing member 40, enters the grooves 313 during the molding of the sealing member 40. Thus, after the sealing member 40 is molded, a portion of the sealing member 40 that enters the grooves 313 functions as a stopper that prevents the sealing member 40 from detaching from the core end 311. Therefore, it is possible to further improve the adhesion of the sealing member 40 to the core end 311.

Figure 9:
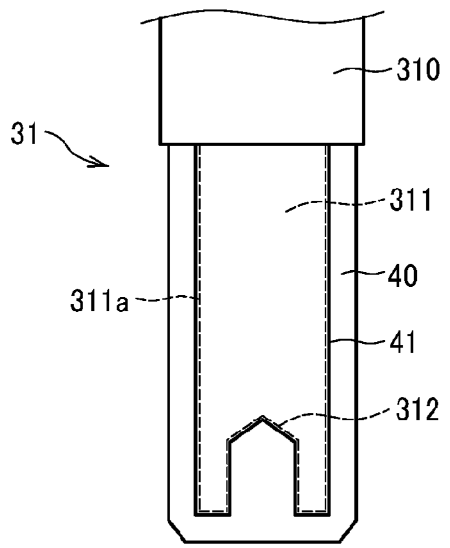
FIG. 9 is a plan view illustrating the openably closing valve provided with an adhesive between a core end and the sealing member.

Alternatively, as illustrated in FIG. 9, an adhesive 41 may be coated on a contact portion between the core end 311 and the sealing member 40. Thus, it is possible to further improve the adhesion of the sealing member 40 to the core end 311. When molding the sealing member 40 and the openably closing valve 31, it is preferable to perform the primary vulcanization in a state where the adhesive 41 is coated in advance on the core end 311.

Next, results of an experiment on the effect of suppressing fluctuations in the amount of ink discharged from the nozzles 14 by the openably closing valve and the sealing member of the above-described embodiment will be described.

The configuration of the present embodiment uses the openably closing valve 31 and the sealing member 40 configured as illustrated in FIG. 5. A perfluoroelastomer compound, which is a material of the sealing member, includes 20 parts by weight of MT carbon black, 4 parts by weight of triallyl isocyanurate, and 1 part by weight of peroxide with respect to 100 parts by weight of "DAI-EL GA-55®": (manufactured by Daikin Industries, Ltd.). The core 310 and the sealing member 40 are integrally molded by pressing. The primary vulcanization of the sealing member 40 is performed as a press vulcanization at 160° C. for 10 minutes, and the secondary vulcanization is performed as a vulcanization using a thermal retention oven at 250° C. for 4 hours. A liquid discharge head including the openably closing valve 31 formed as described above is referred to as an "Example".

Figure 10:
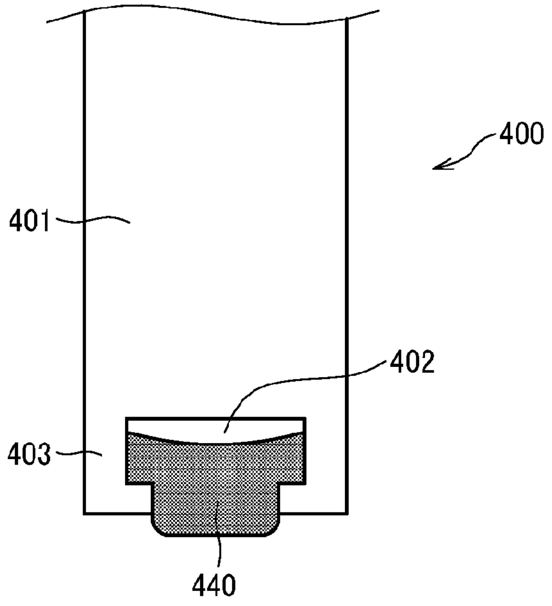
FIG. 10 is a plan view illustrating a configuration of an openably closing valve different from that of the present embodiment.

Here, a liquid discharge head including an openably closing valve of an aspect different from that of the present embodiment will be tested as a "Comparative Example". The configuration of the openably closing valve and the sealing member provided in the liquid discharge head of the "Comparative Example" will be described with reference to FIG. 10. An openably closing valve 400 includes a concave 402 on a bottom face of a distal end portion 401 on a nozzle side. In the concave 402, a sealing member 440 is provided. Pressure is applied to the sealing member 440 that is in a state of a molded part, to fit the sealing member into the concave 402. A liquid discharge head including the openably closing valve 400 described above is referred to as a "Comparative Example". In the openably closing valve 400, the sealing member 440 is simply mechanically fitted into the concave 402 as described above, and thus, the adhesion of the sealing member 440 in the concave 402 is not sufficient, and a gap is formed between the concave 402 and the sealing member 440 as illustrated in FIG. 10.

The openably closing valves including the sealing members of the above-described "Example" and "Comparative Example" were connected to a piezoelectric element and lead wires were pulled out from liquid discharge modules to manufacture a liquid discharge head.

Other setting conditions are described below. Note that an initial sealing position of 5 μm of the openably closing valve described below refers to a displacement amount of the piezoelectric element in a sealed state of FIG. 6B, when a position where the sealing member 40 of FIG. 6A contacts the nozzle plate 15 is used as a reference position of the displacement amount of the piezoelectric element.

Initial sealing position of openably closing valve by piezoelectric element: 5 μm Initial setting value of lift amount of openably closing valve: 20 μm Diameter of concave at nozzle side: 500 μm Hole diameter of nozzles: 150 μm Ink viscosity: 30 mPa*S Pressure applied to ink chamber 0.45 MPa Supply time of ink: 30 minutes In each of the liquid discharge heads of the above-described "Example" and "Comparative Example", flow rates of the ink were measured after 1 minute, 10 minutes, and 30 minutes. The results indicated that the flow rate of the ink in the "Example" was almost constant until 30 minutes after the start. On the other hand, in the "Comparative Example", the flow rate increased with time, and finally leakage occurred. After the evaluation, when the liquid discharge head of the "Comparative Example" was disassembled to confirm a face position of the sealing member, it was found that the openably closing valve had contracted in the longitudinal direction. The reason for this is considered to be that there is a gap between the sealing member and the core, which leads to a displacement of the sealing member.

Thus, according to the configuration of the openably closing valve 31 of the present embodiment, it is possible to suppress variations in the flow rate of the ink due to the liquid discharge head.

Figure 11:
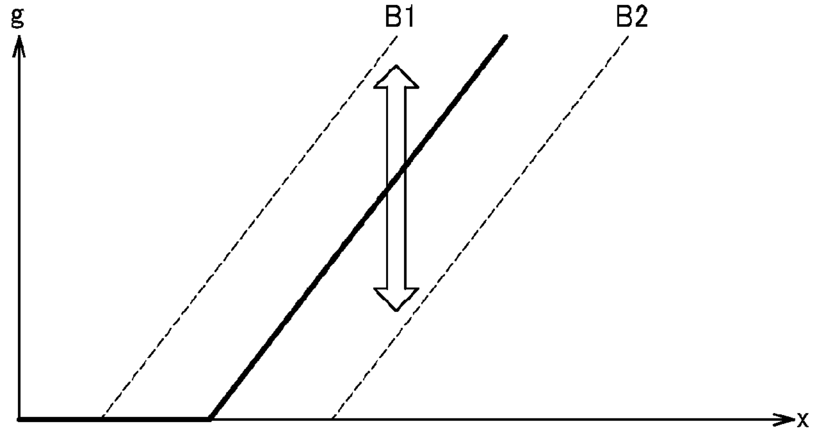
FIG. 11 is a graph illustrating a relationship between a displacement amount of a piezoelectric element and a lift amount in a comparative example of FIG. 10.

FIG. 11 is a graph illustrating variations in the lift amount g in the configuration of the "Comparative Example". A horizontal axis X in FIG. 11 indicates the displacement amount of the piezoelectric element, and a vertical axis in FIG. 11 indicates the lift amount g.

As illustrated in FIG. 11, the lift amount g varies between a dotted line B1 in which an upper limit of the lift amount g is plotted and a dotted line B2 in which a lower limit of the lift amount g is plotted. This variation is mainly caused by the gap formed between the sealing member 440 and the concave 402. That is, when such a gap is formed, a position of a bottom face of the sealing member tends to vary, and the amount of compression of the sealing member when the openably closing valve is closed also varies.

Figure 12:
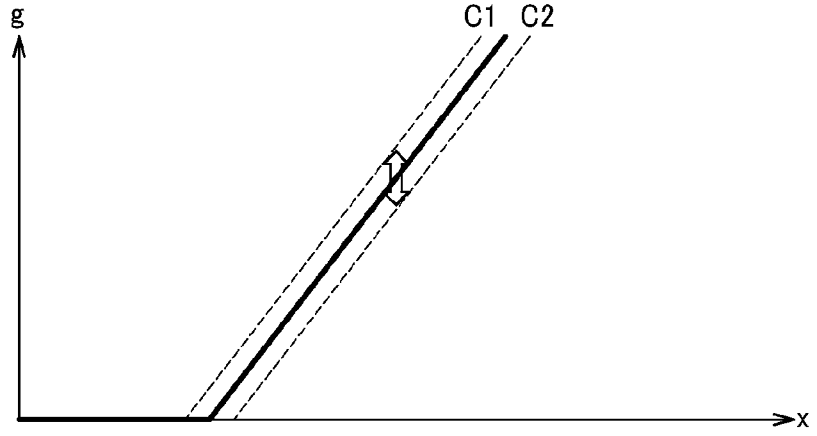
FIG. 12 is a graph illustrating a relationship between a displacement amount of a piezoelectric element and a lift amount in the embodiment of FIG. 3.

On the other hand, FIG. 12 is a graph illustrating variations in the lift amount g when the openably closing valve 31 of the "Embodiment" is used. As can be understood by comparing FIGS. 11 and 12, in the present embodiment, the fluctuation range of the lift amount g indicated as the width between a dotted line C1 and a dotted line C2 is smaller than the fluctuation amount in the case of using the openably closing valve 400 of FIG. 11. Therefore, it can be understood that, according to the configuration of the present embodiment, it is possible to discharge a stable amount of ink from the nozzles 14. This is because, in the openably closing valve 31 of the present embodiment, the sealing member 40 has good adhesion to the core 310.

Next, a liquid discharge apparatus including the liquid discharge head 10 described above will be described.

Figure 13A:
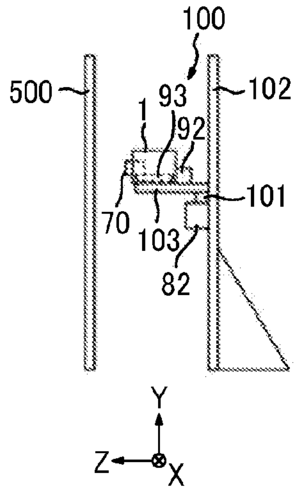
FIGS. 13A and 13B are schematic views of an overall configuration of a liquid discharge apparatus.
Figure 13B:
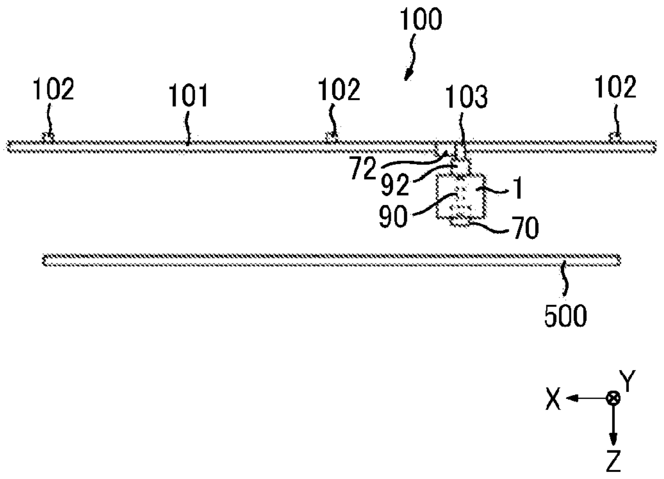

FIGS. 13A and 13B are schematic views of an overall configuration of a liquid discharge apparatus 100. FIG. 13A is a side view of the liquid discharge apparatus, and FIG. 13B is a plan view of the liquid discharge apparatus. The liquid discharge apparatus 100 is installed facing a liquid application target 500, which is an example of a target. The liquid discharge apparatus 100 includes an X-axis rail 101, a Y-axis rail 102 intersecting the X-axis rail 101, and a Z-axis rail 103 intersecting the X-axis rail 101 and the Y-axis rail 102. In particular, in the present embodiment, the X-axis rail 101, the Y-axis rail 102, and the Z-axis rail 103 each extend in directions perpendicular to each other.

The Y-axis rail 102 holds the X-axis rail 101 so that the X-axis rail 101 is movable in a Y-axis direction. The X-axis rail 101 holds the Z-axis rail 103 so that the Z-axis rail 103 is movable in an X-axis direction. The Z-axis rail 103 holds a carriage 1 so that the carriage 1 is movable in a Z-axis direction.

The liquid discharge apparatus 100 includes a first Z-direction driving portion 92 that moves the carriage 1 in the Z-axis direction along the Z-axis rail 103, and an X-direction driving portion 72 that moves the Z-axis rail 103 in the X-axis direction along the X-axis rail 101. The liquid discharge apparatus 100 further includes a Y-direction driving portion 82 that moves the X-axis rail 101 in the Y-axis direction along the Y-axis rail 102. Further, the liquid discharge apparatus 100 includes a second Z-direction driving portion 93 that moves a head holding body 70 in the Z-axis direction with respect to the carriage 1.

The liquid discharge head described above is attached to the head holding body 70 so that the nozzles 14 (see FIG. 2) of the liquid discharge head 10 face the liquid application target 500. In the liquid discharge apparatus 100 having such a configuration, the carriage 1 is moved in the directions of the X-axis, the Y-axis, and the Z-axis, while ink, which is an example of a liquid, is discharged from the liquid discharge head attached to the head holding body 70 toward the liquid application target 500 to draw an image on the liquid application target 500.

Figure 14:
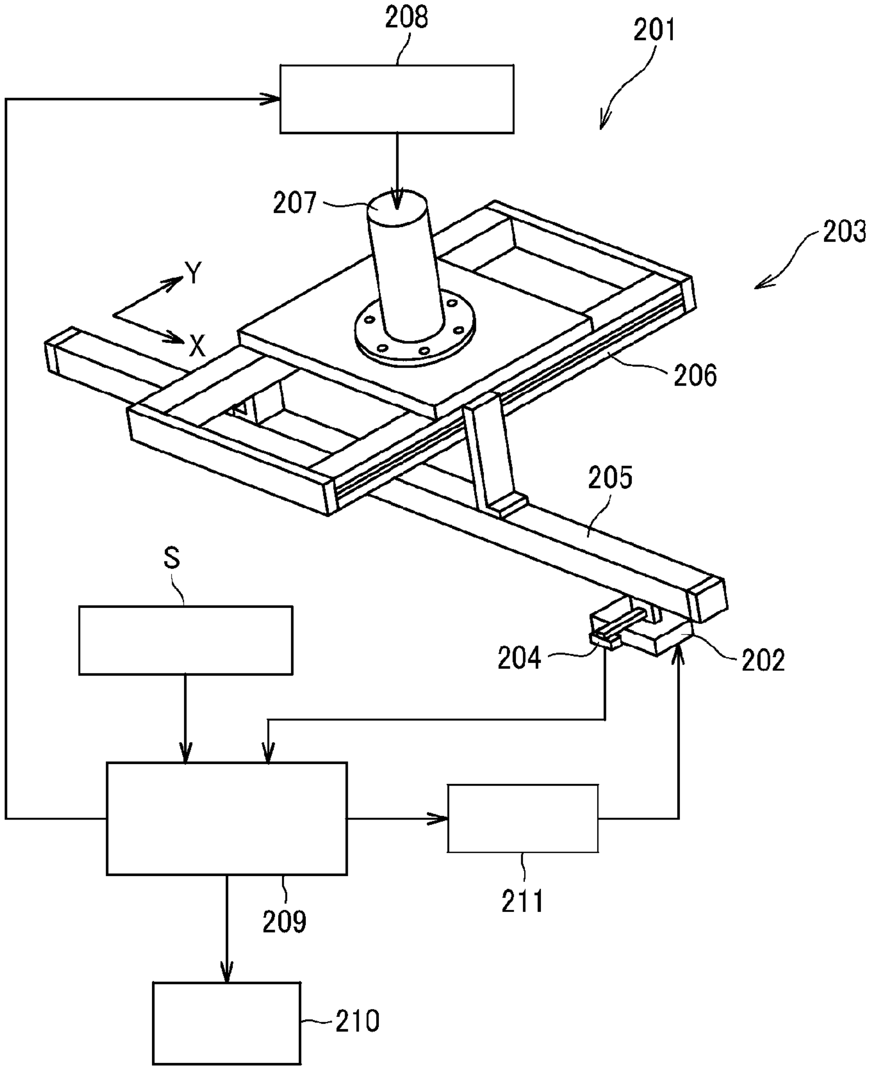
FIG. 14 is a schematic view of an overall configuration of a liquid discharge apparatus different from that of FIGS. 13A and 13B.
Figure 15:
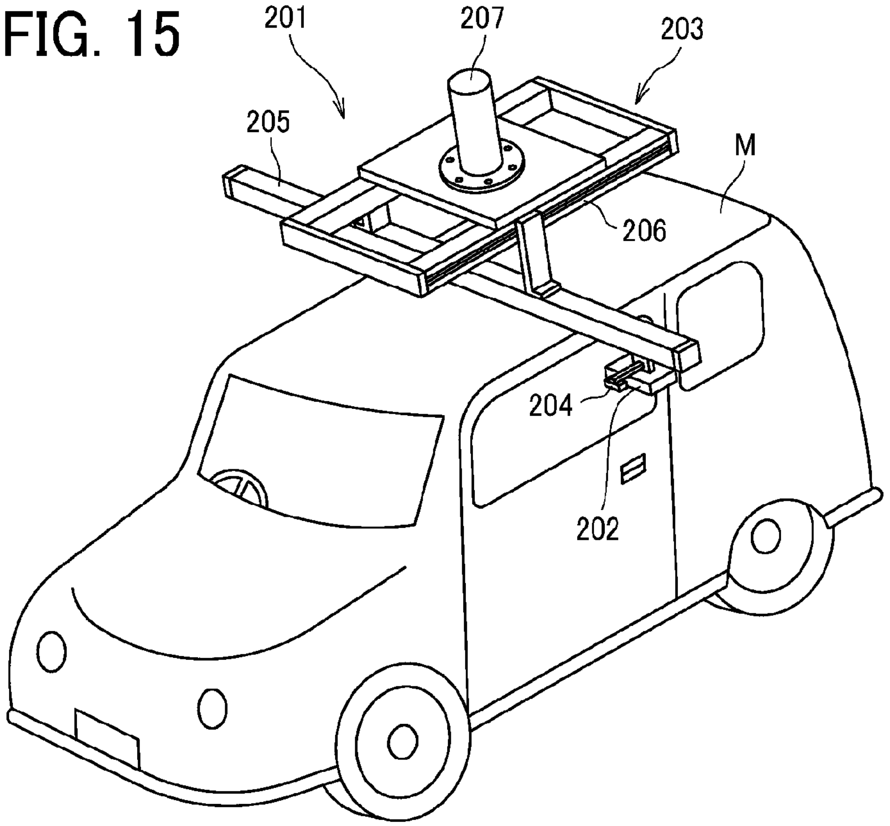
FIG. 15 is a perspective view illustrating an arrangement example of the liquid discharge apparatus of FIGS. 1A and 1B with respect to an automobile.
Figure 16:
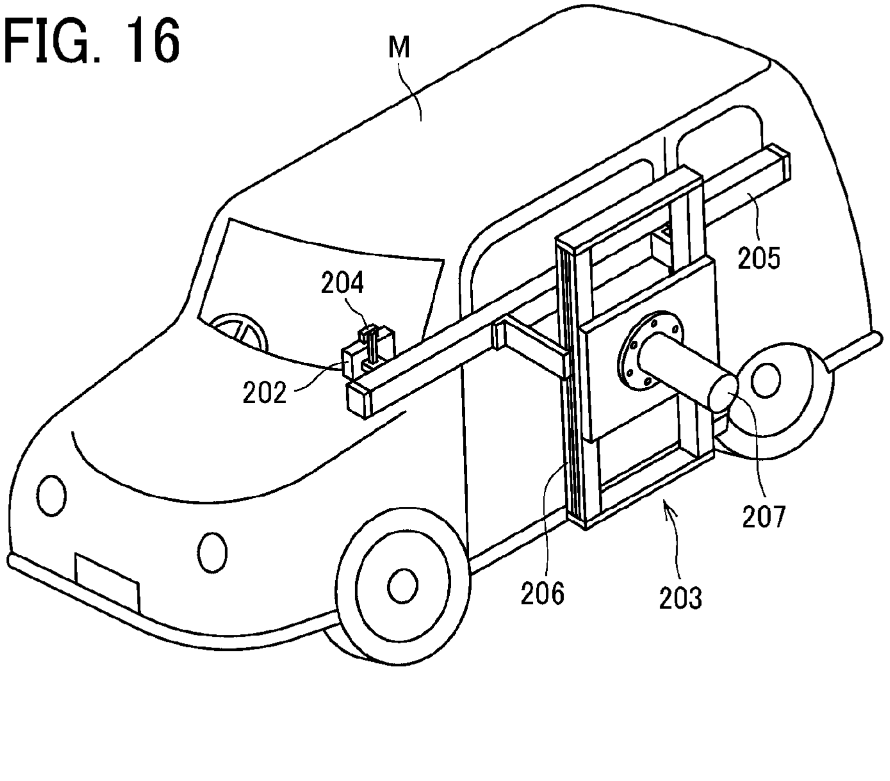
FIG. 16 is a perspective view illustrating another arrangement example of the liquid discharge apparatus of FIGS. 1A and 1B with respect to the automobile.
Figure 17A:
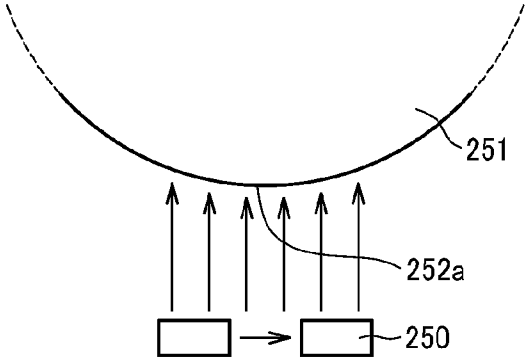
FIGS. 17A to 17C are explanatory views of a case where liquid is discharged onto a spherical face by the liquid discharge apparatus.
Figure 17B:
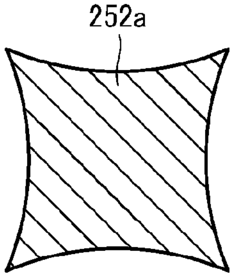
Figure 17C:
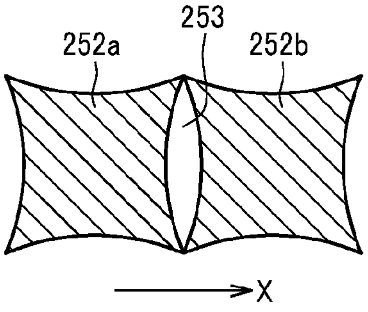

Next, a configuration of an inkjet printer 201, which is another embodiment of the liquid discharge apparatus, will be described with reference to FIGS. 14 to FIGS. 17A to 17C. FIG. 14 is a configuration diagram illustrating the configuration of the inkjet printer 201 as an example of the liquid discharge apparatus according to the embodiment. FIG. 15 is an explanatory diagram illustrating an example of the arrangement of the inkjet printer 201 illustrated in FIG. 14 with respect to an automobile M to be printed. FIG. 16 is an explanatory diagram illustrating another example of the arrangement of the inkjet printer 201 illustrated in FIG. 14 with respect to the automobile M, which is a liquid application target. FIGS. 17A to 17C are explanatory diagrams of a case where an image is printed on a spherical face by an inkjet printer. FIG. 17A is an explanatory diagram of a case where an image is printed on the spherical face by the inkjet printer 201. FIG. 17B is an explanatory diagram illustrating a result of printing a rectangle on the spherical face. FIG. 17C is an explanatory diagram of a case where rectangles are continuously printed on the spherical face by the inkjet printer 201.

As illustrated in FIG. 14, the inkjet printer 201 generally includes a liquid discharge head 202, a camera 204 as an imaging means, an XY-table 203, image editing software S, a controller 209, and a driving portion 211. The camera 204 is arranged in the vicinity of the liquid discharge head 202. The XY-table 203 moves the liquid discharge head 202 and the camera 204 in an X-direction and a Y-direction. The image editing software S edits an image captured by the camera 204. The controller 209 operates the XY-table 203, based on a control program set in advance, to cause the liquid discharge head 202 to discharge ink. The driving portion 211 is controlled by the controller 209 to move the camera 204 to an image capturing position and move the liquid discharge head 202 to a liquid discharge position.

The liquid discharge head 202 includes a plurality of valve-type nozzles. The liquid discharge head 202 discharges ink toward a face to be coated of an object to be coated M, which is a liquid application target. Note that, here, the term "ink" also includes "paint".

Each of the valve-type nozzles discharges ink perpendicularly to the liquid discharge head 202. That is, an ink discharge face of the liquid discharge head 202 is parallel to an XY-plane formed by the movement of the XY-table 203, and ink dots discharged from each of the valve-type nozzles are discharged in a direction perpendicular to the XY-plane. In addition, discharge directions of the ink discharged from each of the valve-type nozzles are parallel to each other. Each valve-type nozzle is coupled to an ink tank of a predetermined color. The ink tank is pressurized by a pressurization device. If the distance between each of the valve-type nozzles and a printing face of the liquid application target M is about 20 cm, the ink dots can be discharged onto the printing face without any problem.

The XY-table 203 generally includes an X-axis 205 and a Y-axis 206. The X-axis 205 includes a linear movement mechanism. The Y-axis 206 moves the X-axis 205 in the Y-direction while holding the X-axis 205 with two arms. The liquid discharge head 202 and the camera 204 that will be described later, are attached to a slider of the X-axis 205. A shaft 207 is provided on the Y-axis 206. The shaft 207 is held by a robot arm 208. By using the robot arm 208, the liquid discharge head 202 can be freely arranged at a predetermined position where ink is to be discharged onto the liquid application target M. For example, if the liquid application target M is an automobile, the liquid discharge head 202 can be arranged in a lateral position as illustrated in FIG. 16 or in an upper part as illustrated in FIG. 15. The operation of the robot arm 208 is controlled based on a program stored in the controller 209 in advance.

The camera 204 is arranged on the slider of the X-axis 205 in the vicinity of the liquid discharge head 202. While moving in the XY-directions, the camera 204 captures images of a predetermined range of the liquid application face of the liquid application target M at constant, short intervals. The camera 204 is a so-called digital camera. In the camera 204, specifications such as a resolution and specifications of a lens that captures a plurality of finely divided images are appropriately selected in the predetermined range of the liquid application face. A plurality of finely divided images of the liquid application face are captured by the camera 204 continuously and automatically, according to a program provided in the controller 209 in advance.

The controller 209 includes a so-called microcomputer including a storage device, a central processing unit, an input device such as a keyboard and a mouse, a monitor 210, and a Digital Versatile Disc (DVD) player or the like, as desired. The storage device records and saves various types of programs, data of captured images, data of images to be printed, and the like. The central processing unit executes various types of processes according to the programs. The monitor 210 displays information input to the controller 209, processing results by the controller 209, and the like.

The controller 209 uses image processing software to perform image processing on a plurality of pieces of image data of finely divided images captured by the camera 204. Specifically, the controller 209 generates a synthetic printing face by projecting the liquid application face of the liquid application target M, which is not a plane, onto a plane. Further, the controller 209 edits a drawing target image to be continuous with an image formed on the liquid application face, to generate an edited drawing target image. For example, the edited drawing target image is generated as follows. A printed image 252*b*, which is the drawing target image illustrated in FIG. 17C, is edited to match the synthetic printing face so that a non-printed region 253 is formed between the printed image 252*b* and a printed image 252*a* adjacent to the printed image 252*b*. When ink is actually discharged by the liquid discharge head 202, based on this edited drawing target image, it is possible to form the printed image 252*b* without a gap between the printed image 252*b* and the printed image 252*a*. The controller 209 controls an operation of a driving portion 211 to form an image by using the plurality of finely divided images captured by the camera 204 and the ink discharged from each nozzle of the liquid discharge head 202.

In FIG. 17A, discharge directions of the ink ejected from each of inkjet nozzles mounted in a nozzle head 250 are illustrated in a case of forming a two-dimensional rectangle on a spherical face of a liquid application target 251 of a spherical object by the inkjet nozzles. In FIG. 17B, the ink ejected from each inkjet nozzle mounted in the nozzle head 250 is discharged in a direction perpendicular to the nozzle head 250, so that the printed image 252*a* printed on the face of the liquid application target 251 is a rectangle having a distorted peripheral shape.

An embodiment of the present embodiment has been described above. However, the present embodiment is not limited to the above-described embodiment, and various modifications can be made without departing from the gist of the present embodiment.

As used herein, the term "liquid discharge apparatus" means an apparatus that includes a liquid discharge head and drives the liquid discharge head to discharge a liquid. The liquid discharge apparatus may include both an apparatus for discharging liquid to an object onto which liquid can adhere and an apparatus for discharging liquid toward gas or into a liquid.

The "liquid discharge apparatus" may include means that feed, convey, and eject the object onto which liquid can adhere, and may further include a pretreatment apparatus, a post-treatment apparatus, and the like.

For example, the "liquid discharge apparatus" may be an image forming apparatus that discharges ink to form an image on a sheet, or a stereoscopic fabrication apparatus (three-dimensional fabrication apparatus) that discharges a fabrication liquid onto a powder layer in which powder material is formed in layers, to form a stereoscopic fabricated object (three-dimensional fabricated object).

The "liquid discharge apparatus" is not limited to an apparatus for discharging liquid to visualize meaningful images, such as letters or figures. For example, the liquid discharge apparatus also includes an apparatus for forming patterns and the like that do not have inherent meaning, or an apparatus for fabricating three-dimensional images.

The term "object onto which liquid can adhere" mentioned above means the liquid application target described above, that is, an object onto which liquid can adhere at least temporarily, and includes an object onto which liquid is adhered and fixed, and an object onto which liquid is adhered and into which the liquid permeates. Specific examples of the "object onto which liquid can adhere" include recording media such as a paper sheet, a recording paper, a recording sheet, a film, and a cloth, electronic components such as an electronic substrate and a piezoelectric element, and media such as a powder layer (powder material layer), an organ model, and a testing cell. The "object onto which liquid can adhere" includes any object onto which liquid adheres, unless particularly limited.

Examples of the material of the "object onto which liquid can adhere" include any materials onto which liquid can adhere even temporarily, such as paper, thread, fiber, fabric, leather, metal, plastic, glass, wood, and ceramic.

The "liquid discharge apparatus" may be an apparatus in which the liquid discharge head and the object onto which liquid can adhere are relatively moved. However, the liquid discharge apparatus is not limited to such an apparatus. More specifically, the liquid discharge apparatus may be a serial type apparatus that moves the liquid discharge head or a line type apparatus that does not move the liquid discharge head.

Examples of the "liquid discharge apparatus" further include a treatment liquid coating apparatus that discharges a treatment liquid onto a sheet to coat a face of the sheet with the treatment liquid with the aim of reforming the face of the sheet, and an injection granulation apparatus that ejects a composition liquid obtained by dispersing a raw material in a solution, from a nozzle to produce fine particles of the raw material.

The terms "image formation", "recording", "character printing", "image printing", "printing", and "fabrication" used herein may be used synonymously with each other.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

[Aspect 1]

A liquid discharge head comprising:

a discharge port, from which a liquid is to be discharged; and an openably closing valve configured to move in a moving direction toward the discharge port to openably close the discharge port, the openably closing valve including a core, wherein the core has a core end at one end of the core opposing the discharge port, the core end has:

a concave in the core end, the concave recessed in a direction opposite to the discharge port; and an elastic member covering the concave and an outer side face of the core end continuously.

[Aspect 2]

The liquid discharge head according to aspect 1, wherein the core end has a groove on the outer side face of the core end, and the elastic member covers the groove.

[Aspect 3]

The liquid discharge head according to aspect 1 or 2, wherein the elastic member is adhered to the core end with an adhesive.

[Aspect 4]

The liquid discharge head according to any one of aspects 1 to 3, wherein the elastic member is adhered to the concave in the core end.

[Aspect 5]

The liquid discharge head according to any one of aspects 1 to 4, wherein the core end has a convex portion surrounding the concave, and the convex portion protruding from the concave toward the discharge port, and a ratio of thicknesses of the elastic member satisfies $1.6 \leq T1/T2 \leq 6$, where T1 is a first thickness of a first portion of the elastic member at the deepest end of the concave of the core end in the moving direction of the openably closing valve, and T2 is a second thickness of a second portion of the elastic member at the convex portion of the core end in the moving direction of the openably closing valve.

[Aspect 6]

The liquid discharge head according to any one of aspects 1 to 5, wherein the core end includes a convex portion surrounding the concave, and the convex portion protruding from the concave toward the discharge, and the elastic member has a chamfer at a position corresponding to at least one of an outer peripheral end or an inner peripheral end of the convex portion of the core end.

[Aspect 7]

The liquid discharge head according to any one of aspects 1 to 6, further comprising:

a discharge port forming member having the discharge port, wherein the core end has a convex portion surrounding the concave of the core end; and the elastic member has a flat portion opposing the discharge port forming member, the flat portion is closer to the discharge port forming member than the convex portion, and the elastic member and the core end satisfy $W1<W2$, where W1 is a width of the flat portion of the elastic member in a radial direction, and W2 is a width of the convex portion of the core end in the radial direction.

[Aspect 8]

The liquid discharge head according to any one of aspects 1 to 7, wherein the elastic member covers around periphery of the outer side face of the core end.

[Aspect 9]

A liquid discharge apparatus comprising the liquid discharge head according to any one of aspects 1 to 8.

REFERENCE SIGNS LIST

10 Liquid discharge head
14 Nozzle (discharge port)
15 Nozzle plate (discharge port forming member)
30 Liquid discharge module
31 Openably closing valve
311 Core end
311*a* Side face on outer side of core end
311*b* Bottom face of core end
312 Concave
313 Groove
319 Convex portion
32 Piezoelectric element (driving body)
40 Sealing member (elastic member)
40*b* Flat portion of sealing member
41 Adhesive
100 Liquid discharge apparatus
A Longitudinal direction (moving direction of openably closing valve)
D1 Outer peripheral edge of nozzle side end face of convex portion
D2 Inner peripheral edge of nozzle side end face of convex portion

The invention claimed is:

1. A liquid discharge head, comprising:

a discharge port, from which a liquid is to be discharged; and an openably closing valve to move in a moving direction toward the discharge port to openably close the discharge port, the openably closing valve including a core, wherein:

the core includes a core end at one end of the core opposing the discharge port, and the core end includes:

a concave in the core end, the concave recessed in a direction opposite to the discharge port and having a cylindrical inner face along the moving direction; and an elastic structure covering the concave and an outer side face of the core end continuously, the elastic structure being in the concave without a gap.

2. The liquid discharge head according to claim 1, wherein:

the core end includes a groove on the outer side face of the core end, and the elastic structure covers the groove.

3. The liquid discharge head according to claim 1, wherein:

the elastic structure is adhered to the core end with an adhesive.

4. The liquid discharge head according to claim 1, wherein:

the elastic structure is adhered to the concave in the core end.

5. The liquid discharge head according to claim 1, wherein:

the core end includes a convex portion surrounding the concave, the convex portion protrudes from the concave toward the discharge port, and a ratio of thicknesses of the elastic structure satisfies $1.6 \leq T1/T2 \leq 6$, where T1 is a first thickness of a first portion of the elastic structure at the deepest end of the concave of the core end in the moving direction of the openably closing valve, and T2 is a second thickness of a second portion of the elastic structure at the convex portion of the core end in the moving direction of the openably closing valve.

6. The liquid discharge head according to claim 1, wherein:

the core end includes a convex portion surrounding the concave, the convex portion protrudes from the concave toward the discharge port, and the elastic structure includes a chamfer at a position corresponding to at least one of an outer peripheral end or an inner peripheral end of the convex portion of the core end.

7. The liquid discharge head according to claim 1, further comprising:

a plate including the discharge port, wherein the core end includes a convex portion surrounding the concave of the core end, the elastic structure includes a flat portion opposing the plate, the flat portion is closer to the plate than the convex portion, and the elastic structure and the core end satisfy $W1 < W2$, where W1 is a width of the flat portion of the elastic structure in a radial direction, and W2 is a width of the convex portion of the core end in the radial direction.

8. The liquid discharge head according to claim 1, wherein:

the elastic structure covers around a periphery of the outer side face of the core end.

9. A liquid discharge apparatus comprising the liquid discharge head according to claim 1.

10. A liquid discharge head, comprising:

a discharge port, from which a liquid is to be discharged; and an openably closing valve to move in a moving direction toward the discharge port to openably close the discharge port, the openably closing valve including a core, wherein:

the core includes a core end at one end of the core opposing the discharge port, the core end includes:

a concave in the core end, the concave recessed in a direction opposite to the discharge port; and an elastic structure covering the concave and an outer side face of the core end continuously, the core end includes a convex portion surrounding the concave, the convex portion protrudes from the concave toward the discharge port, and a ratio of thicknesses of the elastic structure satisfies $1.6 \leq T1/T2 \leq 6$, where T1 is a first thickness of a first portion of the elastic structure at the deepest end of the concave of the core end in the moving direction of the openably closing valve, and T2 is a second thickness of a second portion of the elastic structure at the convex portion of the core end in the moving direction of the openably closing valve.

11. The liquid discharge head according to claim 10, wherein:

the core end includes a groove on the outer side face of the core end, and the elastic structure covers the groove.

12. The liquid discharge head according to claim 10, wherein:

the elastic structure is adhered to the core end with an adhesive.

13. The liquid discharge head according to claim 10, wherein:

the elastic structure is adhered to the concave in the core end.

14. The liquid discharge head according to claim 10, wherein:

the elastic structure includes a chamfer at a position corresponding to at least one of an outer peripheral end or an inner peripheral end of the convex portion of the core end.

15. The liquid discharge head according to claim 10, wherein:

the elastic structure covers around a periphery of the outer side face of the core end.

16. A liquid discharge apparatus comprising the liquid discharge head according to claim 10.

17. A liquid discharge head, comprising:

a discharge port, from which a liquid is to be discharged;

an openably closing valve to move in a moving direction toward the discharge port to openably close the discharge port, the openably closing valve including a core; and a plate including the discharge port, wherein:

the core includes a core end at one end of the core opposing the discharge port, the core end includes:

a concave in the core end, the concave recessed in a direction opposite to the discharge port; and an elastic structure covering the concave and an outer side face of the core end continuously, the core end includes a convex portion surrounding the concave of the core end, the elastic structure includes a flat portion opposing the plate, the flat portion is closer to the plate than the convex portion, and the elastic structure and the core end satisfy $W1 < W2$, where W1 is a width of the flat portion of the elastic structure in a radial direction, and W2 is a width of the convex portion of the core end in the radial direction.

18. A liquid discharge apparatus comprising the liquid discharge head according to claim 17.

* * * * *